UNITED STATES PATENT OFFICE.

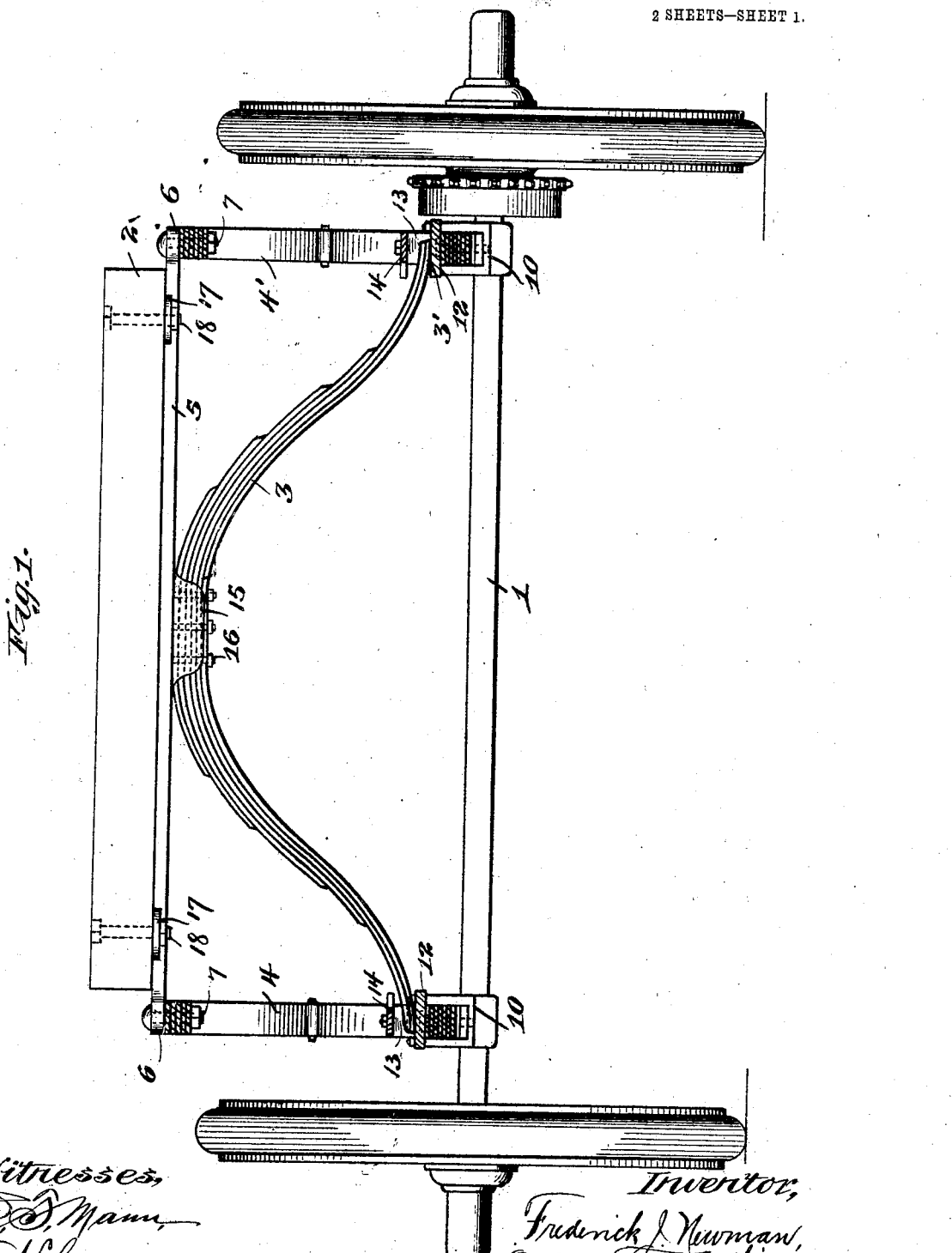

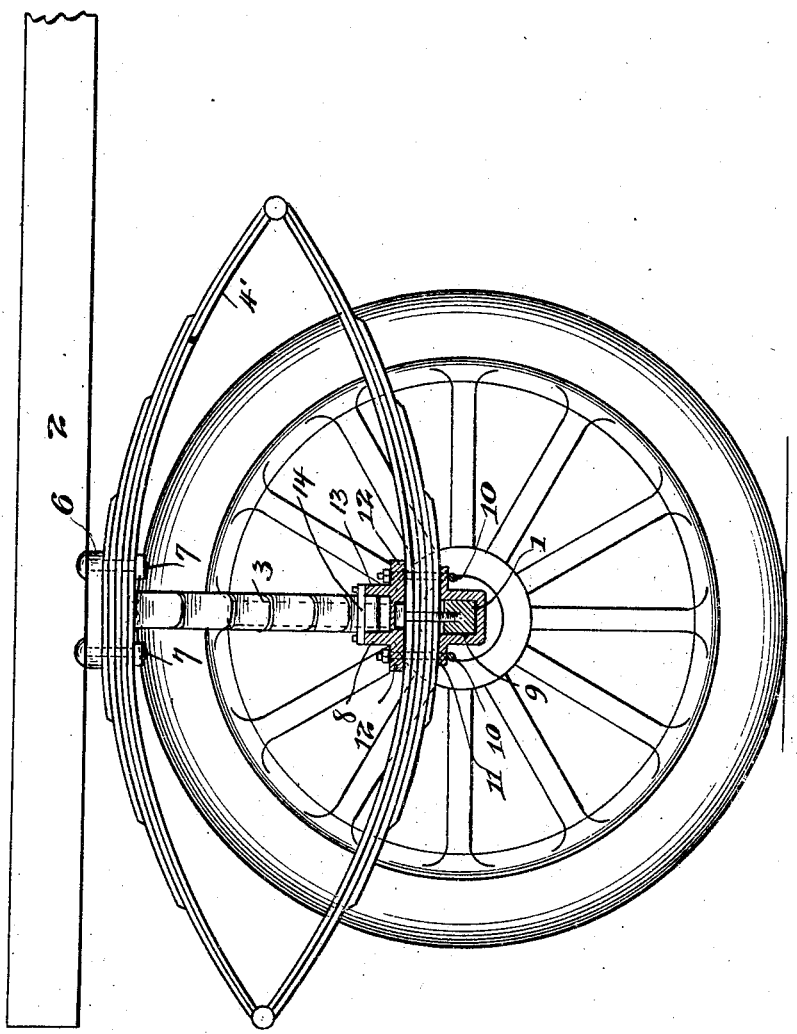

FREDERICK J. NEWMAN, OF CHICAGO, ILLINOIS, ASSIGNOR TO WOODS MOTOR VEHICLE COMPANY, OF CHICAGO, ILLINOIS, A CORPORATION OF ILLINOIS.

VEHICLE.

No. 819,244.   Specification of Letters Patent.   Patented May 1, 1906.

Application filed January 9, 1905. Serial No. 240,304.

*To all whom it may concern:*

Be it known that I, FREDERICK J. NEWMAN, a citizen of the United States, residing at Chicago, in the county of Cook and State of Illinois, have invented certain new and useful Improvements in Vehicles, of which the following is a specification.

This invention relates to improvements in vehicles; and it consists, more specifically, in improvements in the connections between the running-gear and vehicle-box, whereby the latter is maintained and guided to rise and fall in accurately vertical planes as the springs expand and contract, the invention being of particular importance when embodied in an automobile or self-propelled vehicle wherein the motor is mounted upon the spring-supporting structure.

Among the salient objects of the invention are to provide a construction having increased strength and rigidity while at the same time affording perfect freedom of movement of the spring-supported parts; to provide a structure in which the driving power may be transmitted from the motor to the running-gear without racking stresses upon the structure; to provide a construction which is simple, strong, and at the same time neat and unobtrusive in appearance; to provide a construction in which the rigidity of a set of leaf-springs against a lateral flexure is utilized to maintain the parts in proper relation, and in general to provide a simple and improved construction of the character referred to.

To the above ends the invention consists in the matters hereinafter described, and more particularly pointed out in the appended claims.

The invention will be readily understood from the following description, reference being had to the accompanying drawings, showing one practical and preferred embodiment thereof.

Referring to the drawings, Figure 1 is a view of a vehicle in end elevation embodying the invention, certain parts being shown in transverse vertical section. Fig. 2 is a view, partly in side elevation and partly in longitudinal vertical section, of the parts shown in Fig. 1.

Referring to the drawings, 1 designates the main axle of the vehicle, (the rear axle in this instance;) 2 the vehicle-box or spring-supported frame; 3, a set of transverse leaf-springs, and 4 and 4', respectively, sets of elliptic side springs. The sets of side springs may be connected to the box-frame and axle, respectively, in any suitable or preferred manner which will insure sufficient rigidity and strength of union between said parts. In the present instance a relatively heavy flat supporting-bar 5 is secured to extend transversely across the under side of the box proper, said bar terminating at each end in laterally-broadened T-like heads 6, to which the central portions of the upper halves of the springs 4 4' are secured by means of suitable bolts 7. The lower halves of said springs are rigidly secured to the axle conveniently by means of pairs of embracing-clips, each pair comprising an upper clip member 8, a lower clip member 9, and a pair of U-bolts 10. The clips 8 and 9 are of special construction, the lower being centrally recessed to receive the axle and provided with outstanding ears 11, engaged by the U-bolts, while the upper clip is similarly centrally recessed to provide a seat for the spring and is also provided with ears 12, through which the U-bolts extend. The upstanding side flanges 13, which in part form the spring-seat, are parallel as to their inner faces and rise to a height somewhat greater than the thickness of the end portions 3' of the spring 3, which rests therein, so that the ends of the springs are free to slide upon the bottom of the seat, but are nevertheless confined accurately against lateral movement. In order to prevent the ends of the spring from becoming displaced, a confining-plate 14 is arranged to overlie the spring-seat, said plate being desirably removably bolted to the upstanding sides 13.

The central portion of the semi-elliptic spring 3 is rigidly united with bar 5, a convenient construction being that shown herein, whereon the bar is provided with a pair of relatively long integrally-formed downturned flanges 15, which closely embrace the sides of the spring. A plurality of bolts 16 are extended through the set of springs and the body of the bar 5. The box of the vehicle when it forms a part of the frame which carries the motor will of course be rigidly united with the bar 5, a convenient construction being that shown, in which the bar is provided near each end with lateral ears or lugs through which and the superposed box are extended bolts 18.

It will be understood from the foregoing description that the semi-elliptic spring 3 forms, in effect, a vertical pedestal, uniting the spring-supported structure with the running-gear in such manner as to afford substantial rigidity against relative longitudinal movement of the parts, while at the same time the connection with the pedestal-clips at the ends of said spring is such as to afford perfect freedom of movement in the expansion and contraction of the spring. Moreover, the rigid form of connection between the lock-supporting bar 5 and the axle is such that it contributes substantially to the rigidity of the structure against longitudinal displacement and obviously does not interfere with the freedom of the movement of any of the springs. It will be noted that this pedestal effect is secured without interposing the pedestal upright extending between the box-frame and the axle, therefore enhancing the appearance of neatness and lightness of the structure.

While I have herein shown and described a preferred embodiment of the invention, yet it will be understood that the details of construction and arrangement may be changed without departing from the invention, and I do not, therefore, limit myself to such details except to the extent that they are made the subject of specific claims.

I claim as my invention—

1. In a vehicle, the combination of a running-gear frame, a spring-supported box-frame, a semi-elliptic transversely-disposed spring rigidly bolted at its central portion to one of said frames, slidably connected at its ends with the other frame, lateral guides embracing the end portions of said spring to confine the latter against lateral displacement and a longitudinally-disposed elliptic spring at each end of said semi-elliptic spring having its upper and lower central portions rigidly united with the spring-supported frame and running-gear frame respectively.

2. In a vehicle, the combination with one of the axles of the running-gear, of a transversely-disposed body-supporting bar, a semi-elliptic spring rigidly united at its center to said bar, pedestal-clips mounted upon the respective ends of the axle and receiving the ends of said semi-elliptic spring, each pedestal-clip provided with a seat receiving the ends of the spring and within which the latter is free to reciprocate endwise but is rigidly confined against lateral movement and a longitudinally-disposed elliptic spring, on each side of the vehicle having its central upper portion rigidly united with said box-supporting bar and its central lower portion rigidly united with the pedestal-clip, substantially as described.

3. In a vehicle, the combination with one of the running-gear axles of a transversely-disposed box-supporting bar provided at its central portion with rigidly-united parallel spring-embracing clips, and at each end with a transverse head portion, a semi-elliptic spring having its central portion seated between the clips of said bar and rigidly bolted to the latter, pedestal-clips mounted upon the respective ends of the axle and each provided with a seat having parallel side walls between which the receiving ends of the springs are accurately confined, and a bottom wall upon which the spring rests, and a longitudinally-disposed elliptic spring at each side of the vehicle, having its central upper portion rigidly bolted to the corresponding head of the box-supporting bar, and its lower central portion rigidly united to said pedestal-clip, as and for the purpose set forth.

FREDERICK J. NEWMAN.

Witnesses:
FREDERICK C. GOODWIN,
JAMES R. OFFIELD.